United States Patent
Chaudhari et al.

(10) Patent No.: US 6,346,975 B2
(45) Date of Patent: Feb. 12, 2002

(54) LIQUID CRYSTAL DISPLAY HAVING ALIGNMENT LAYER USING ION BOMBARDED AMORPHOUS MATERIAL 100Å THICKNESS OR LESS

(75) Inventors: Praveen Chaudhari, Briarcliff Manor; James Andrew Lacey, Mahopac; Shui-Chin Alan Lien, Briarcliff Manor, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,323

(22) Filed: Aug. 4, 1998

(51) Int. Cl.⁷ .............................................. G02F 1/1337
(52) U.S. Cl. ...................................... 349/124; 349/132
(58) Field of Search ................................ 349/123, 124, 349/125, 129, 132, 134

(56) References Cited

U.S. PATENT DOCUMENTS

| | | | |
|---|---|---|---|
| 4,911,958 A | * 3/1990 | Mochizuki et al. | 349/124 |
| 5,347,379 A | * 9/1994 | Kawagishi | |
| 5,357,357 A | * 10/1994 | Imazeki et al. | 349/123 |
| 5,596,434 A | * 1/1997 | Walba et al. | 349/123 |
| 5,710,608 A | * 1/1998 | Nakabayashi et al. | 349/123 |
| 5,841,497 A | * 11/1998 | Sato et al. | 349/128 |
| 5,973,761 A | * 10/1999 | Gofuku et al. | 349/123 |

FOREIGN PATENT DOCUMENTS

| | | |
|---|---|---|
| JP | 3-83017 | 4/1991 |
| JP | 5-203958 | 8/1993 |
| JP | 61-177440 | 8/1996 |
| JP | 09230351 A | 9/1997 |

* cited by examiner

Primary Examiner—Kenneth Parker
(74) Attorney, Agent, or Firm—Marian Underweiser; Stephen Bongini; Fleit, Kain, Gibbons, Gutman & Bongini P.L.

(57) ABSTRACT

A liquid crystal display device has first and second substrates, a first electrode layer overlying one surface of the first substrate, and a second electrode layer overlying one surface of the second substrate. A first alignment layer having a thickness of 100 Å or less overlies the first electrode layer, and a second alignment layer overlies the second electrode layer, and a liquid crystal material is disposed between the alignment layers. In one preferred embodiment, the second alignment layer also has a thickness of 100 Å or less, and each alignment layers is a polyimide layer. A method for manufacturing a liquid crystal display device is also provided. According to the method, first and second substrates are provided, a first electrode layer is deposited over the first substrate, and a second electrode layer is deposited over the second substrate. A first alignment layer having a thickness of 100 Å or less is deposited over the first electrode layer, and a second alignment layer is deposited over the second electrode layer. Additionally, the first and second substrates are arranged so that the alignment layers face one another and a space is formed between the substrates. A liquid crystal material is disposed in the space between the first and second substrates.

23 Claims, 2 Drawing Sheets

US 6,346,975 B2

LIQUID CRYSTAL DISPLAY HAVING ALIGNMENT LAYER USING ION BOMBARDED AMORPHOUS MATERIAL 100Å THICKNESS OR LESS

CROSS-REFERENCE TO RELATED APPLICATIONS

Not applicable.

BACKGROUND OF THE INVENTION

1. Field of the Invention

The present invention relates to a liquid crystal display device, and more specifically to a liquid crystal display having an alignment film that reduces image sticking.

2. Description of Prior Art

Flat panel displays have been become increasingly important in the computer industry and in other industries requiring the display of information. Such displays provide unique opportunities for lowering the weight, size, and eventually cost of displaying information. Presently, liquid crystal display ("LCD") devices appear to hold the most promise as the technology that will eventually be used for nearly all flat panel displays. Considerable success has been achieved in using liquid crystal technology for displaying information in small size color televisions, laptop computers, and projection systems, and LCDs are increasingly being used for desktop computers.

The desirability of LCDs has produced an international industry having several billion dollars in annual sales. One conventional LCD device includes liquid crystal cells having liquid crystal sandwiched between transparent electrodes formed on opposed glass substrates (i.e., plates). Another conventional LCD device includes liquid crystal cells having liquid crystal sandwiched between a transparent electrode on glass substrate and a reflective electrode on a non-transparent substrate (e.g., silicon). In either case, an electrical signal is selectively applied between the electrodes to allow the device to modulate incident light and display information.

To obtain contrast, the orientation of the liquid crystal molecules must be uniformly controlled. In a field effect system such as a nematic system (which is designed to twist the liquid crystal molecules by about 0° to 270° between the upper and lower plates), it is preferable to orient the liquid crystal molecules parallel to the substrate surface in a unidirectional manner. The liquid crystals can be aligned through stretching a polymer, rubbing a polymer, depositing a polymer in the form of a Langmuir Blodgett film, or exposing a polymer film to UV radiation. Additionally, alignment can be achieved by depositing particles of SiO on substrates or by etching grooves using microlithography.

One popular alignment technique is to deposit a polyimide alignment film on each transparent electrode to orient the liquid crystal, and then to rub or abrade the polyimide film in a desired direction. More specifically, a polyimide film is formed by applying a wet coat of polyimide to a substrate using known printing or spinning techniques. The wet coat is baked to form a polyimide film on the substrate. After the polyimide film is formed on the substrate, the atomic structure of the film must be aligned in a desired direction in order to orient the liquid crystal molecules in the desired direction. For this purpose, the polyimide film is rubbed in the desired direction with a gigged, flocked, or velvet cloth, and then cleaned to remove debris from the rubbing. In this manner, an alignment film is formed as an insulating layer with an atomic structure aligned so as to orient the liquid crystal molecules in the desired direction.

The LCD device is formed by sandwiching a thin (e.g., five micron) layer of liquid crystal between two glass substrates having transparent conductors and other thin layers of materials that provide electronics and optical filters. When a voltage is applied across the thin layer of liquid crystal, the liquid crystal molecules respond by rotating to minimize the electrostatic energy of the system. This behavior is used to form a light switch that is turned on and off by controlling the rotation of the liquid crystal molecules using an external voltage. A large, addressable array of such liquid crystal light switches is used in the LCD device.

While each liquid crystal light switch should switch on and off instantaneously with the switching of the applied voltage, the thin layer of material used for aligning the liquid crystal in conventional LCD devices accumulates a charge that only leaks slowly over time. For example, when the above-described process is used to align the polyimide film, the film is altered in such a way that the application of a voltage causes charge redistribution to occur. This effect decays relatively slowly over time after the removal of the voltage.

When charge accumulates on a portion of the alignment film, nearby liquid crystal molecules are exposed to a residual voltage after the applied voltage is switched off. The slow decay of this residual voltage results in a slow change in the alignment of the liquid crystal molecules. Thus, with a large array of liquid crystal switches, the LCD device can develop regions with residual charge that keeps the liquid crystal light switches switched locally. In such regions, the displayed image is retained after the applied voltage is switched off. This is known as image sticking and is a highly undesirable drawback of conventional LCD devices. While image sticking can be reduced by carefully choosing the type of alignment layer and the alignment technique, this prevents optimization both in terms of display performance and manufacturing cost.

SUMMARY OF THE INVENTION

In view of these drawbacks, it is an object of the present invention to remove the above-mentioned drawbacks and to provide a liquid crystal display device in which image sticking is significantly reduced or eliminated. The LCD device is formed with a very thin alignment film that allows for charge hopping or tunneling. This significantly reduces charge accumulation so that image sticking is greatly minimized or eliminated. Thus, the LCD device can provide a very high quality display.

A first embodiment of the present invention provides a liquid crystal display device having first and second substrates. A first electrode layer overlies one surface of the first substrate, and a second electrode layer overlies one surface of the second substrate. A first alignment layer having a thickness of 100 Å or less overlies the first electrode layer. Additionally, a second alignment layer overlies the second electrode layer, and a liquid crystal material is disposed between the first and second alignment layers. In one preferred embodiment, the second alignment layer also has a thickness of 100 Å or less, and both alignment layers are polyimide layers.

A second embodiment of the present invention provides a method for manufacturing a liquid crystal display device that has reduced image sticking. According to the method, first and second substrates are provided, a first electrode layer is deposited over one surface of the first substrate, and a second electrode layer is deposited over one surface of the second substrate. A first alignment layer having a thickness of 100 Å or less is deposited over the first electrode layer, and a second alignment layer is deposited over the second electrode layer. Additionally, the first and second substrates are arranged so that the first and second alignment layers face one another and a space is formed between the substrates. A liquid crystal material is disposed in the space between the first and second substrates. In a preferred method, the first alignment layer is deposited by diluting polyimide with a solvent, and spinning, spraying, or printing the diluted polyimide on the first substrate. The atomic structure of the applied polyimide is preferably aligned using ion beam bombardment.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
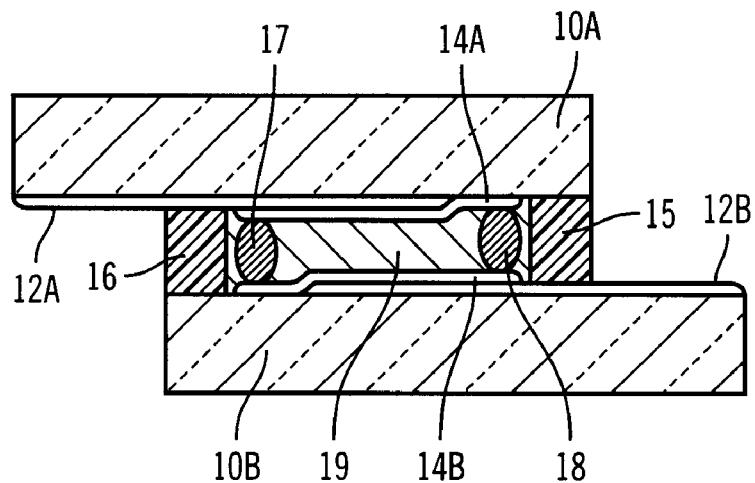
FIG. 1 is a cross-sectional view of a liquid crystal cell of an LCD device.

FIG. 1 shows a cross-sectional view of a liquid crystal cell of a liquid crystal display ("LCD") device. As shown, a liquid crystal cell includes a pair of glass plate substrates 10A and 10B defining a twisted nematic cell. A transparent electrode 12 and an alignment film 14 are provided on each of the substrates 10. Additionally, the liquid crystal cell includes a sealing resin 15 and 16, spacers (e.g., glass beads or plastic spheres) 17 and 18, and twisted nematic liquid crystal 19. In the preferred embodiment, the glass substrates 10A and 10B are bonded together using an adhesive (e.g., glue), and the spacers 17 and 18 separate the alignment film surfaces of the substrates by a space of approximately 5 $\mu$m. The liquid crystal 19 is sandwiched between the two alignment films 14A and 14B.

Figure 2:
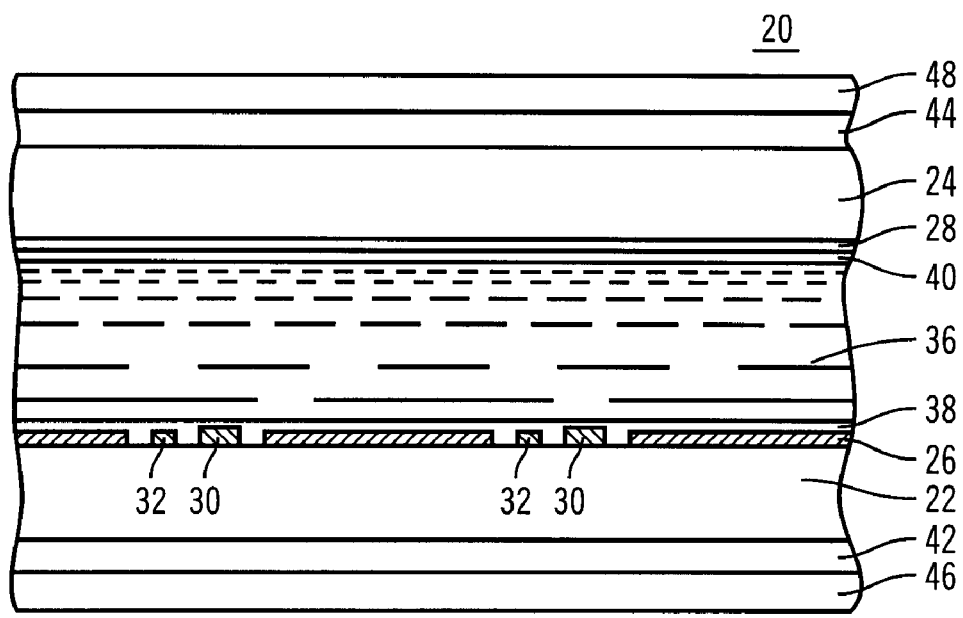
FIG. 2 is a diagram showing the layers of a portion of an LCD device according to a preferred embodiment of the present invention.

FIG. 2 shows the layers of a portion of an LCD device according to a preferred embodiment of the present invention. The LCD display 20 includes a first substrate 22 and a second substrate 24, which are both formed of a transparent material such as glass. The two substrates are arranged parallel to one another and are sealed at the edges (not shown) so as to define a closed interior space. In the preferred embodiment, each substrate has a thickness of approximately 0.7 to 1.1 millimeters and the two substrates are separated by a distance of approximately four to seven microns. An array of electrodes 26 that define pixels of the liquid crystal display are deposited on the first substrate 22, and a continuous electrode 28 is deposited on the second substrate 24. In the preferred embodiment, a transparent film of indium tin oxide (ITO) having a thickness of approximately 500 to 2000 Å is used for the electrodes.

On selected areas of the first substrate 22 where the electrode film is not deposited, semiconductor devices such as diodes and thin film transistors ("TFTs") 30 are formed. Each TFT 30 is controlled by a gate line 32 and a data line (not shown), and the source of each TFT 30 is coupled to one of the electrodes 26. The inside-facing surfaces of the substrates 22 and 24 are then coated with insulating (or poorly conducting) alignment layers 38 and 40, respectively. In the preferred embodiment, each alignment layer is a polyimide film having a thickness of approximately 50 Å that is aligned using ion bombardment. During ion bombardment, the deposited alignment film is irradiated with a beam of atoms so as to arrange the atomic structure of the alignment film in the desired direction in order to orient the liquid crystal molecules. (The ion beam alignment technique is described in detail in U.S. patent application Ser. No. 09/028,018, filed Feb. 23, 1998, which is herein incorporated by reference.)

A liquid crystal material 36 fills the space between the alignment layers. In the preferred embodiment, twisted nematic liquid crystal (e.g., type ZLI-6241-000, which is available from E. Merck Darmstadt of Germany and available in the United States through EM Industries) having a thickness of approximately four to seven microns is used, and the liquid crystal molecules near the alignment layers are aligned such that the long axes of the molecules are almost parallel to the substrate with a small (e.g., one to five degree) pretilt angle away from the substrate surface. Additionally, the exterior surfaces of substrates 22 and 24 are covered with polarizing films 46 and 48, respectively. In some embodiments, optical compensating films 42 and 44 are provided under the polarizing films 46 and 48, respectively. When such compensating films are omitted, light leakage around areas where the electrode material has been removed can be prevented by using a conventional black matrix material (i.e., for normally white applications).

The thin film alignment layers used in embodiments of the present invention can be formed by depositing a diluted material and then performing an alignment technique. For example, in preferred manufacturing processes, polyimide is diluted with a solvent or thinner such as γ-butyrolactone, bulyl cellosolue, or N-methyl-2-pyrrolidone. The diluted polyimide is spun or spayed onto the substrates, and after drying an alignment is performed. It has been found experimentally that a dilution factor of 1:10 produces a very thin film of polyimide on a glass substrate, and that such thin films provide sufficient alignment of the liquid crystal molecules.

In embodiments of the present invention, reduced thickness alignment layers permit rapid charge hopping or tunneling, so charge accumulation on the alignment layers is greatly minimized or even eliminated. More specifically, tunneling currents are exponentially dependent on film thickness and a thin film on the order of 50 Å can tunnel charge quite effectively. Additionally, charge can hop with the reduced thickness film. Defects introduced into the alignment layer not only introduce the charge that could cause image sticking, but when a thin film is used also provides a conduction path to the adjacent electrode. Thus, the charge is eliminated so image sticking does not occur.

Figure 3:
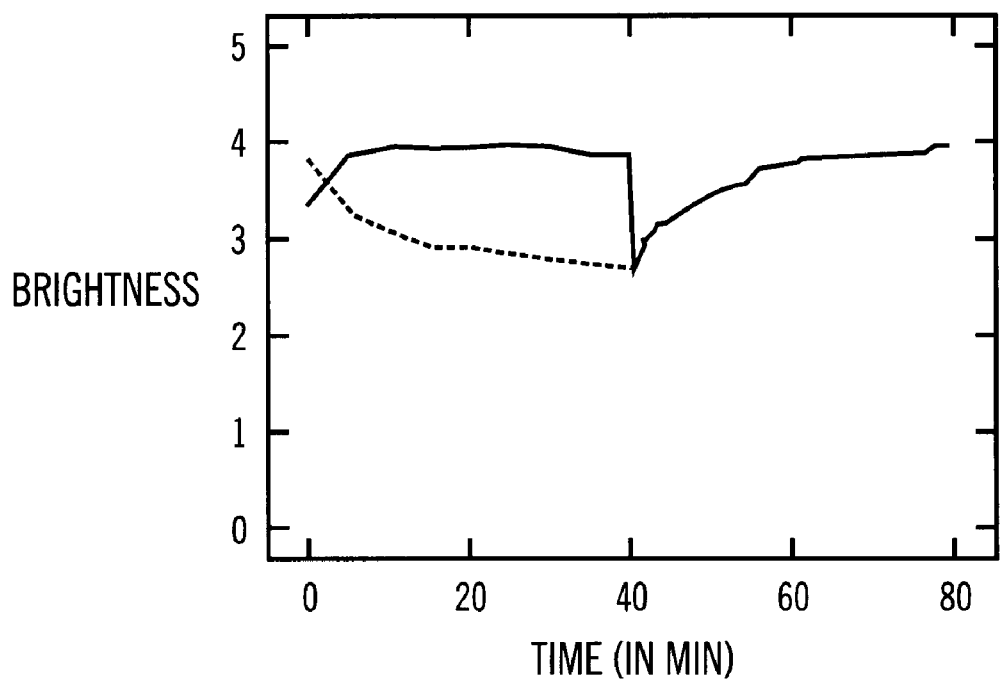
FIG. 3 is a graph showing light transmission over time for an LCD device having an ion beam-aligned polyimide film.
Figure 4:
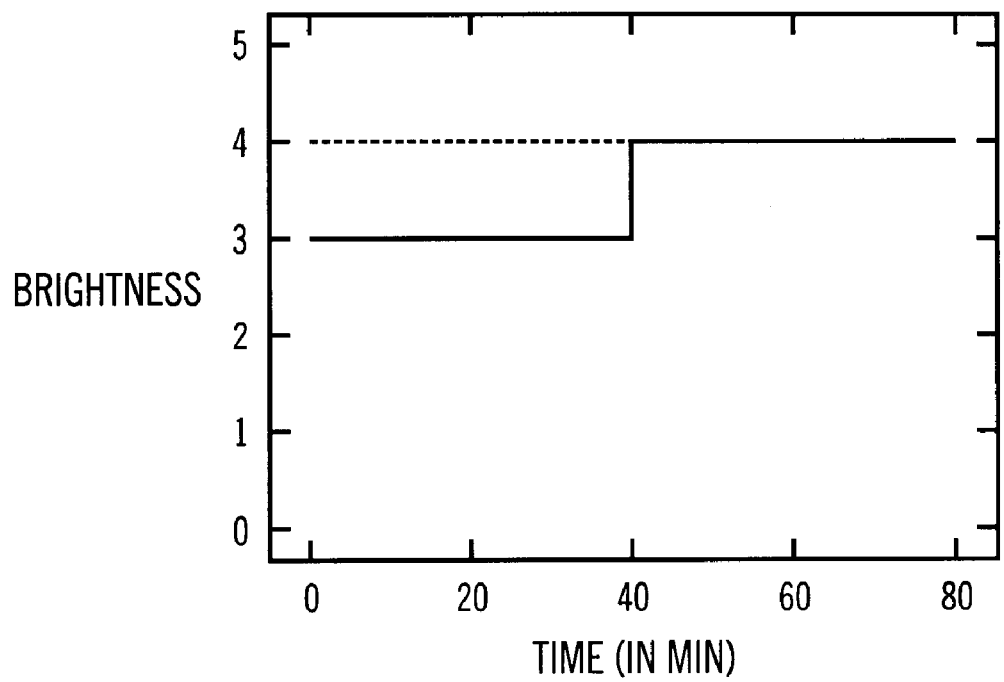
FIG. 4 is a graph showing light transmission over time for an LCD device according to an embodiment of the present invention.

FIG. 3 shows the effect of image sticking on the display of an LCD device formed with 600 Å thick ion beam-aligned polyimide alignment layers. As shown in FIG. 4, when 100 Å thick ion beam-aligned polyimide alignment layers are used, there is no observable image sticking. That is, the effect on light transmission of a voltage change is step-like or almost instantaneous. Thus, the LCD device has significantly reduced charge accumulation and image sticking is greatly minimized or eliminated. This allows the present invention to provide a very high quality display device.

The embodiments of the present invention described above relate to LCD devices having polyimide alignment layers that are aligned using an ion bombardment technique. However, in further embodiments, various types of films can be employed in conjunction with various alignment techniques to form insulating (or poorly conducting) alignment films for the LCD device. Any film that is optically transparent and amorphous or fine grained is suitable. (The term amorphous means that the atomic structure of the film has no preferred direction or orientation.) For example, a suitable alignment film can be formed using: hydrogenated diamond-like carbon (DLC), amorphous hydrogenated silicon, SiC, $SiO_2$, glass, $Si_3N_4$, $Al_2O_3$, $CeO_2$, $SnO_2$, or $ZnTiO_2$. Basically, any type of polymer or monomeric material can be used as long as the formed film is optically transparent, particularly in the visible spectrum.

Similarly, the alignment can be performed using any type of particle beam, such as those employing atoms, molecules, or clusters that are either neutral or ionic. Furthermore, laser techniques, UV techniques, or even mechanical rubbing techniques can be used to align the structure of the alignment layers. Additionally, other design choices, such as the type of liquid crystal, the layout and types of electrodes and circuit elements, and the types of substrates could easily be adapted by one of ordinary skill in the art. Likewise, embodiments of the present invention may not include all of the features described above. For example, polarizing films may not be included in all embodiments.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A liquid crystal display device comprising:
   a first substrate;
   a first electrode layer overlying a first surface of the first substrate;
   a first alignment layer overlying the first electrode layer;
   a second substrate;
   a second electrode layer overlying a first surface of the second substrate;
   a second alignment layer overlying the second electrode layer; and
   a nematic liquid crystal material disposed between the first alignment layer and the second alignment layer,
   wherein at least one of the first alignment layer and the second alignment layer has a thickness of 100 Å or less,
   the at least one alignment layer is made from an amorphous material whose natural atomic structure has no preferred direction or orientation, and
   the liquid crystal material is twisted nematic liquid crystal.

2. The liquid crystal display device as defined in claim 1, wherein each of the first and second alignment layers is a polyimide layer.

3. The liquid crystal display device as defined in claim 1, wherein the nematic liquid crystal material is a non-ferroelectric liquid crystal material.

4. The liquid crystal display device as defined in claim 1,
   wherein each of the first alignment layer and the second alignment layer is made from an amorphous material whose natural atomic structure has no preferred direction or orientation, and
   at least the surface of each of the first alignment layer and the second alignment layer is modified to create an atomic arrangement that aligns the liquid crystal material.

5. A liquid crystal display device comprising:
   a first substrate;
   a first electrode layer overlying a first surface of the first substrate;
   a first alignment layer overlying the first electrode layer;
   a second substrate;
   a second electrode layer overlying a first surface of the second substrate;
   a second alignment layer overlying the second electrode layer; and
   a nematic liquid crystal material disposed between the first alignment layer and the second alignment layer,
   wherein at least one of the first alignment layer and the second alignment layer has a thickness of 100 Å or less, and
   each of the first and second alignment layers is made from a material in a group consisting of hydrogenated diamond-like carbon, amorphous hydrogenated silicon, SiC, $SiO_2$, glass, $Si_3N_4$, $Al_2O_3$, $CeO_2$, $SnO_2$, and $ZnTiO_2$.

6. The liquid crystal display device as defined in claim 5, further comprising:
   a first polarizing film overlying a second surface of the first substrate; and
   a second polarizing film overlying a second surface of the second substrate.

7. The liquid crystal display device as defined in claim 9, further comprising:
   a first optical compensating film disposed between the first polarizing film and the second surface of the first substrate; and
   a second optical compensating film disposed between the second polarizing film and the second surface of the second substrate.

8. The liquid crystal display device as defined in claim 5, wherein each of the first and second alignment layers has a thickness of 30 to 60 Å.

9. The liquid crystal display device as defined in claim 5, wherein each of the first and second alignment layers has a thickness of 100 Å or less.

10. The liquid crystal display device as defined in claim 9, wherein each of the first and second substrates is a glass substrate, and each of the first and second electrode layers is an optically-transparent conducting layer.

11. The liquid crystal display device as defined in claim 10, wherein each of the first and second electrode layers is an indium tin oxide layer.

12. The liquid crystal display device as defined in claim 10,
wherein the first and second substrates are separated by approximately four to seven microns,
each of the electrode layers has a thickness of approximately 500 to 2000 Å.

13. A method for manufacturing a liquid crystal display device, said method comprising the steps of:
providing first and second substrates
depositing a first electrode layer over a first surface of the first substrate;
depositing a first alignment layer over the first electrode layer, the first alignment layer having a thickness of 100 Å or less;
depositing a second electrode layer over a first surface of the second substrate;
depositing a second alignment layer over the second electrode layer;
arranging the first and second substrates so that the first surface of the first substrate faces the first surface of the second substrate and a space is formed between the first and second substrates; and
disposing a nematic liquid crystal material in the space between the first and second substrates,
wherein the first alignment layer is made from an amorphous material whose natural atomic structure has no preferred direction or orientation, and
the step of depositing the first alignment layer includes the sub-steps of:
diluting polyimide with a solvent;
spinning or spraying the diluted polyimide on the first substrate; and
aligning the atomic structure of the applied polyimide by ion beam bombardment.

14. The method as defined in claim 13, wherein the aligning step is performed by at least one of neutral particle beam bombardment, laser exposure, UV exposure, and microlithography.

15. A method for manufacturing a liquid crystal display device, said method comprising the steps of:
providing first and second substrates;
depositing a first electrode layer over a first surface of the first substrate;
depositing a first alignment layer over the first electrode layer, the first alignment layer having a thickness of 100 Å or less;
depositing a second electrode layer over a first surface of the second substrate;
depositing a second alignment layer over the second electrode layer;
arranging the first and second substrates so that the first surface of the first substrate faces the first surface of the second substrate and a space is formed between the first and second substrates; and
disposing a nematic liquid crystal material in the space between the first and second substrates,
wherein each of the first and second alignment layers is made from a material in a group consisting of hydrogenated diamond-like carbon, amorphous hydrogenated silicon, SiC, $SiO_2$, glass, $Si_3N_4$, $Al_2O_3$, $CeO_2$, $SnO_2$, and $ZnTiO_2$.

16. The method as defined in claim 15, wherein the second alignment layer has a thickness of 100 Å or less.

17. The method as defined in claim 16,
wherein each of the first and second substrates is a glass substrate, and
each of the first and second electrode layers is an indium tin oxide layer.

18. The method as defined in claim 16,
wherein the first and second substrates are separated by approximately four to seven microns,
each of the electrode layers has a thickness of approximately 500 to 2000 Å.

19. The method as defined in claim 15, further comprising the step of performing an alignment technique to align the atomic structure of at least the surface of the first alignment layer.

20. A method for manufacturing a liquid crystal display device, said method comprising the steps of:
providing first and second substrates;
depositing a first electrode layer over a first surface of the first substrate;
depositing an amorphous film whose atomic structure has no preferred direction or orientation so as to form a first alignment layer over the first electrode layer, the first alignment layer having a thickness of 100 Å or less;
depositing a second electrode layer over a first surface of the second substrate;
depositing a second alignment layer over the second electrode layer;
arranging the first and second substrates so that the first surface of the first substrate faces the first surface of the second substrate and a space is formed between the first and second substrates; and
disposing a nematic liquid crystal material in the space between the first and second substrates,
wherein the liquid crystal material is twisted nematic liquid crystal.

21. The method as defined in claim 20, wherein the step of depositing an amorphous film includes the sub-steps of:
diluting polyimide with a solvent; and
spinning or spraying the diluted polyimide on the first substrate,
the method further includes the step of aligning the atomic structure of the applied polyimide.

22. A method for manufacturing a liquid crystal display device, said method comprising the steps of:
providing first and second substrates;
depositing a first electrode layer over a first surface of the first substrate;
depositing a polyimide layer so as to form a first alignment layer over the first electrode layer, the polyimide layer having a thickness of 100 Å or less;
depositing a second electrode layer over a first surface of the second substrate;
depositing a second alignment layer over the second electrode layer;
arranging the first and second substrates so that the first surface of the first substrate faces the first surface of the second substrate and a space is formed between the first and second substrates;
disposing a nematic liquid crystal material in the space between the first and second substrates; and
aligning the atomic structure of the polyimide layer by ion beam bombardment.

23. A liquid crystal display device comprising:
a first substrate;
a first electrode layer overlying a first surface of the first substrate;
a first alignment layer overlying the first electrode layer;
a second substrate;
a second electrode layer overlying a first surface of the second substrate;
a second alignment layer overlying the second electrode layer; and
a nematic liquid crystal material disposed between the first alignment layer and the second alignment layer,
wherein at least one of the first alignment layer and the second alignment layer has a thickness of 100 Å or less,
the at least one alignment layer is made from an amorphous material whose natural atomic structure has no preferred direction or orientation, and
the at least one alignment layer is not a polyimide layer.

* * * * *